United States Patent
Guignard et al.

(10) Patent No.: US 8,804,771 B2
(45) Date of Patent: Aug. 12, 2014

(54) METHOD FOR MANAGING A DATA TRANSMISSION FROM A SENDER DEVICE, CORRESPONDING COMPUTER-READABLE STORAGE MEDIUM AND SENDER DEVICE

(75) Inventors: Romain Guignard, Rennes (FR); Arnaud Closset, Cesson-Sévigné (FR)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 13/109,887

(22) Filed: May 17, 2011

(65) Prior Publication Data

US 2011/0286545 A1     Nov. 24, 2011

(30) Foreign Application Priority Data

May 21, 2010 (FR) ...................... 10 53947

(51) Int. Cl.
*H04J 3/07* (2006.01)
(52) U.S. Cl.
USPC .......................................... 370/508
(58) Field of Classification Search
CPC ................. H04N 21/23406; H04N 21/44004; H04J 3/065; H04J 3/0655; H04J 3/0661; H04W 56/0085
See application file for complete search history.

(56) References Cited

U.S. PATENT DOCUMENTS

| | | | |
|---|---|---|---|
| 2006/0143335 A1* | 6/2006 | Ramamoorthy et al. | 710/58 |
| 2009/0183197 A1* | 7/2009 | Matthews | 725/32 |
| 2011/0002379 A1* | 1/2011 | Raveendran | 375/240.01 |

FOREIGN PATENT DOCUMENTS

| | | |
|---|---|---|
| EP | 1168731 A1 | 1/2002 |
| GB | 2306073 A | 4/1997 |

* cited by examiner

*Primary Examiner* — Chirag Shah
*Assistant Examiner* — Rina Pancholi
(74) *Attorney, Agent, or Firm* — Canon U.S.A., Inc. IP Division

(57) ABSTRACT

A sending device receives applications data blocks to be transmitted to a receiving device according to a clock rate defined by transport periods, the applications data blocks being encoded before transmission by application of a first source encoding up to the processing of a change request. The sending device determines a drift between a number of applications data blocks received by the sending device and a number of applications data blocks transmitted after encoding by the sending device. The sending device determines, taking account of the determined drift, a transition applications data block from which a second source encoding is applied in response to the change request. The transmission of the stream is then adapted in such a way that the transmission of the encoded transition data block is aligned with a start of a transport period.

8 Claims, 13 Drawing Sheets

| Threshold MB (1) | Transition MB(1) | Delta(1) |
| --- | --- | --- |
| Threshold MB (2) | Transition MB(2) | Delta(2) |
| Threshold MB (3) | Transition MB(3) | Delta(3) |
| Threshold MB (4) | Transition MB(4) | Delta(4) |

Fig. 11

METHOD FOR MANAGING A DATA TRANSMISSION FROM A SENDER DEVICE, CORRESPONDING COMPUTER-READABLE STORAGE MEDIUM AND SENDER DEVICE

CROSS-REFERENCE TO RELATED APPLICATIONS

This application claims the benefit under 35 U.S.C. §119 (a)-(d) of French Patent Application No. 1053947, filed on May 21, 2010 and entitled "Method for managing a data transmission from a sender device, corresponding computer program product, storage means and sender device".

The above cited patent application is incorporated herein by reference in its entirety.

BACKGROUND OF THE INVENTION

1. Field of the Invention

The present invention relates to data transmission between a sending device and a receiving device.

The invention can be applied especially but not exclusively to data transmission in a system of video distribution between a source application (that generates for example a video content coming from a DVD player) placed upstream to the sending device and at least one receiving application (for example a television set) placed downstream to the receiving device.

The present invention also relates to management of source encoding implemented by an encoder included in the sending device located upstream to a transmission channel, for example of a synchronous type and with constant bandwidth (i.e. with constant bit rate).

2. Description of the Related Art

In a system of video distribution between a source application and at least one receiver application, the pieces of applications data to be transmitted are preliminarily stored in a buffer memory of the sending device before this data is transported through the transmission channel implemented in the system. This buffer memory is designed to absorb the difference in rate between an applications clock defining the applications data production clock rate and a network clock defining the applications data transmission clock rate for transmission through the transmission channel. However, this difference in rate is not entirely absorbed by the buffer memory and a divergence remains between the rate of production of the data by the applications layer and the rate of transportation of this data by the transport layer. A divergence of this kind may lead to a modification of the end-to-end latency of the system.

For low-latency real-time distribution systems supporting for example interactive type video applications, the preferred transmission channel is of a synchronous type with constant bit rate, guaranteeing a constant transmission time.

However, in view of this property of constant bit rate, it is necessary in the sending device to match the quantity of data to be transmitted with the capacity of the transmission channel. The pieces of raw data (for example of a video type) coming from the application are then compressed by the sending device before transmission.

Radio transmission systems working in the 60 GHz (RF millimeter waveband) are particularly well suited to the short-distance transmission of data at very high bit-rates. However, the random nature of the transmission channel may cause the network layer to modify the bandwidth allocated to an application in order to adapt its retransmission scheme or error-correction scheme to the new conditions of transmission. In such cases, the application must also match its data volume to the new capacity of the transmission channel that is dedicated to it and thus modify its source encoding parameters.

One of the main problems related to the modification of the source encoding (i.e. the encoding parameters used by the encoder to encode the applications data blocks) following a reallocation of the bandwidth is to maintain a constant quality of service, i.e. to prevent any interruption of the application for the user. To avoid this type of unpleasantness, the system should be able to maintain a constant end-to-end latency despite the combined changes in bandwidth and source encoding. Thus, when the bandwidth diminishes and increases respectively, the compression rate of the source encoding must be higher and lower respectively.

Furthermore, in a system with low transmission latency, i.e. a system where the memory resources are small, there is little room for maneuver to compensate for modifications in end-to-end latency, even transient modifications, which lead to overflows of buffer memory of the sending device and/or the receiving device.

In the prior art, there are several techniques of source encoding modification that take account of the parameters of the network.

According to a known approach presented in the patent document GB 2306073, the quantification parameters as well as the bit-rate requirements are computed as a function of "leaky bucket" parameters and the fill rate of the different buffer memories. This is in order to avoid congestion phenomena.

One drawback of this prior art approach lies in the unpredictable nature of the effective switch-over at the level of transport between applications data that have undergone a first source encoding and applications data that have undergone a second source encoding.

Thus, in the above mentioned context of a combined change of bandwidth and source encoding, using the above-mentioned known approach, it can happen that the source encoding is not consistent with the bandwidth allocated during several transport periods, thus leading to a modification of the end-to-end latency or a poor use of the bandwidth allocated to the application.

SUMMARY OF THE INVENTION

An object of the present invention is to overcome one or more of these different drawbacks of the prior art.

Another object of the present invention is to provide a technique for transmitting data between a sending device and a receiving device to maintain constant end-to-end latency in the context of a combined change in bandwidth and source encoding, whatever the rates of the applications clock and of the network clock.

Another object of the present invention is to maximize the use of bandwidth during a combined change of bandwidth and source encoding to ensure the best possible (visual) rendering in relation to the available bandwidth.

Another object of the present invention is to provide a technique of this kind that is simple to implement and costs little.

In accordance with one aspect of the invention there is provided a method for managing a transmission of a data stream from a sending device, the sending device receiving applications data blocks to be transmitted to a receiving device according to a clock rate defined by transport periods, the applications data blocks being encoded before transmission by application of a first source encoding up to the processing of a change request.

The sending device:
  determines a drift between a number of applications data blocks received by the sending device and a number of applications data blocks transmitted after encoding by the sending device;
  determines, taking account of the determined drift, a transition applications data block from which a second source encoding is applied in response to the change request; and
  adapts the transmission of the stream in such a way that the transmission of the encoded transition data block is aligned with a start of a transport period.

Thus, the drift between the applications data production rate and the encoded applications data transportation rate is taken into account when determining the data block (transition data block) on which the change in source encoding must operate, and it is ensured that this determined data block will be transmitted to the start of a transport period. This keeps a constant end-to-end latency and an alignment adapted to the transition data block on a start of a transport period, thus enabling an easy management of re-transmission and a protocol inter-layer cooperation based on a common event which is the start of a transport period.

Advantageously, determining a drift comprises:
  identifying the last encoded data block that has been transmitted during the transport period preceding the processing of the change request;
  determining the quantity of data transmitted from the last identified encoded data block.

Advantageously, the transition applications data block is determined in also taking account of the determined quantity of transmitted data.

Thus, the drift accumulated over the transportation periods is determined in a simple manner. Indeed it is determined from a quantity of transmitted data of the last encoded data block that had been transmitted during the transport period preceding the processing of the change request.

According to an advantageous characteristic, the sending device chooses a time shift to be applied between the instant of start of reception of the applications data blocks and the instant of start of transmission of the encoded data blocks, as a function of a period of time needed for executing the determining of the drift and the determining the transition applications data block.

In choosing a time shift (here below also called an overall initial latency) between the instant of start of reception of the data and the instant of start of transmission of the data, it is possible to choose the transition data block which will enable the maximum use of allocated bandwidth; i.e. adapting the transmission in such a way that the transmission of the encoded transition data block is aligned with a start of a transport period improves the consumption of bandwidth (minimizing a period of time during which the bandwidth is oversized with respect to the applied source encoding).

A judicious choice of the value of the time shift makes the system more reactive, i.e. it is possible to minimize the duration between the instant of processing of the change request and the instant at which this change is effective.

Advantageously, the sending device:
  determines a number of applications data blocks representing a cumulative sum of variation in size of encoded data blocks to be transmitted relative to a target value of size;
  determines the transition applications data block taking account also of the determined number of applications data blocks.

Thus, the transition data block is adjusted according to the bandwidth really used. Thus, it is possible to reduce the compression constraint on certain data blocks (for example data blocks corresponding to zones of an image with high complexity) and to tighten this constraint on other data blocks (for example data blocks corresponding to zones of an image with low complexity).

According to an advantageous characteristic, the adapting the transmission of the stream comprises adding padding data, complementing the encoded data block transmitted just before the encoded transition data block, until the encoded transition data block is aligned with a start of a transport period.

Adding padding data makes it possible, in a synchronous system without any use of time stamping, firstly to align the encoded transition data block with a start of a transition period and secondly to correct the drift between the number of data blocks produced by the application and the number of data blocks transmitted.

Advantageously, the size of the applications data blocks is chosen as a function of the precision of a clock in charge of defining the rate.

Thus, the fact of having a data block period (for example a macro-block) adapted to the precision of the clock which defines the clock rate of the transport of the encoded data and serves as a common reference for each device of the system, prevents any deterioration of the overall precision of the system.

In accordance with another aspect of the present invention there is provided a computer program product comprising program code instructions for implementing the above-mentioned method (in any one of its different embodiments) when the program is executed on a computer.

In accordance with another aspect of the present invention there is provided a computer-readable storage medium storing a computer program comprising a set of instructions executable by a computer for implementing the above-mentioned method (in any one of its different embodiments).

In accordance with another aspect of the present invention there is provided a sending device which manages a transmission of a data stream, the sending device receiving applications data blocks to be transmitted to a receiving device according to a clock rate defined by transport periods, the applications data blocks being encoded before transmission by application of a first source encoding up to the processing of a change request.

The sending device further comprises:
  a first determining unit which determines a drift between a number of applications data blocks received by the sending device and a number of applications data blocks transmitted after encoding by the sending device;
  a second determining unit which, taking account of the determined drift, determines a transition applications data block from which a second source encoding is applied in response to the change request; and
  an adapting unit which adapts the transmission of the stream in such a way that the transmission of the encoded transition data block is aligned with a start of a transport period.

Advantageously, the sending device comprises units for implementing steps of the method as described here above, in any one of its different embodiments.

BRIEF DESCRIPTION OF THE DRAWINGS

FIG. 11 illustrates an example of a storage table included in the sending node of FIG. 2;

DETAILED DESCRIPTION

Figure 1:
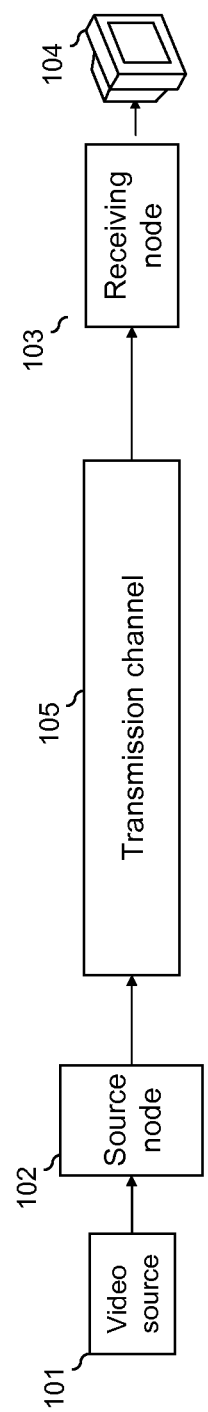
FIG. 1 describes the architecture of a real-time video distribution system according to one particular embodiment of the invention.

FIG. 1 describes the architecture of a real-time video distribution system according to one particular embodiment of the invention. This distribution system is used to display the content of a video source on a screen.

An architecture of this kind is given purely by way of an illustration and the present invention can be implemented in other data transmission systems, whatever the type of data transported, since the invention is not limited to the real-time distribution of video data.

More particularly, the real-time video distribution system comprises:
- a TDM (Time Division Multiplexing) type synchronous transmission channel 105;
- a sending node 102, here below also called a sending device, comprising a first end connected to the channel 105 and a second end connected to a video source 101 (for example a DVD player) generating raw audiovisual applications data;
- a receiving node 103, here below also called a receiving device, comprising a first end connected to the channel 105 and a second end connected to a video display device (or screen) 104;

The sending node 102 receives, at the rate of the applications clock, the applications data coming from the video source 101 and then processes the received applications data before transmission on the channel 105 at the rate of a network clock. The applications clock and the network clock are decorrelated from one another. It is therefore necessary to ensure that the sending node 102 transmits as many pieces of applications data through the channel 105 as it receives from the video source 101 and does so in such a way as to enable a synchronized transmission of the data up to a receiver device, while at the same time preserving a low end-to-end latency.

Figure 2:
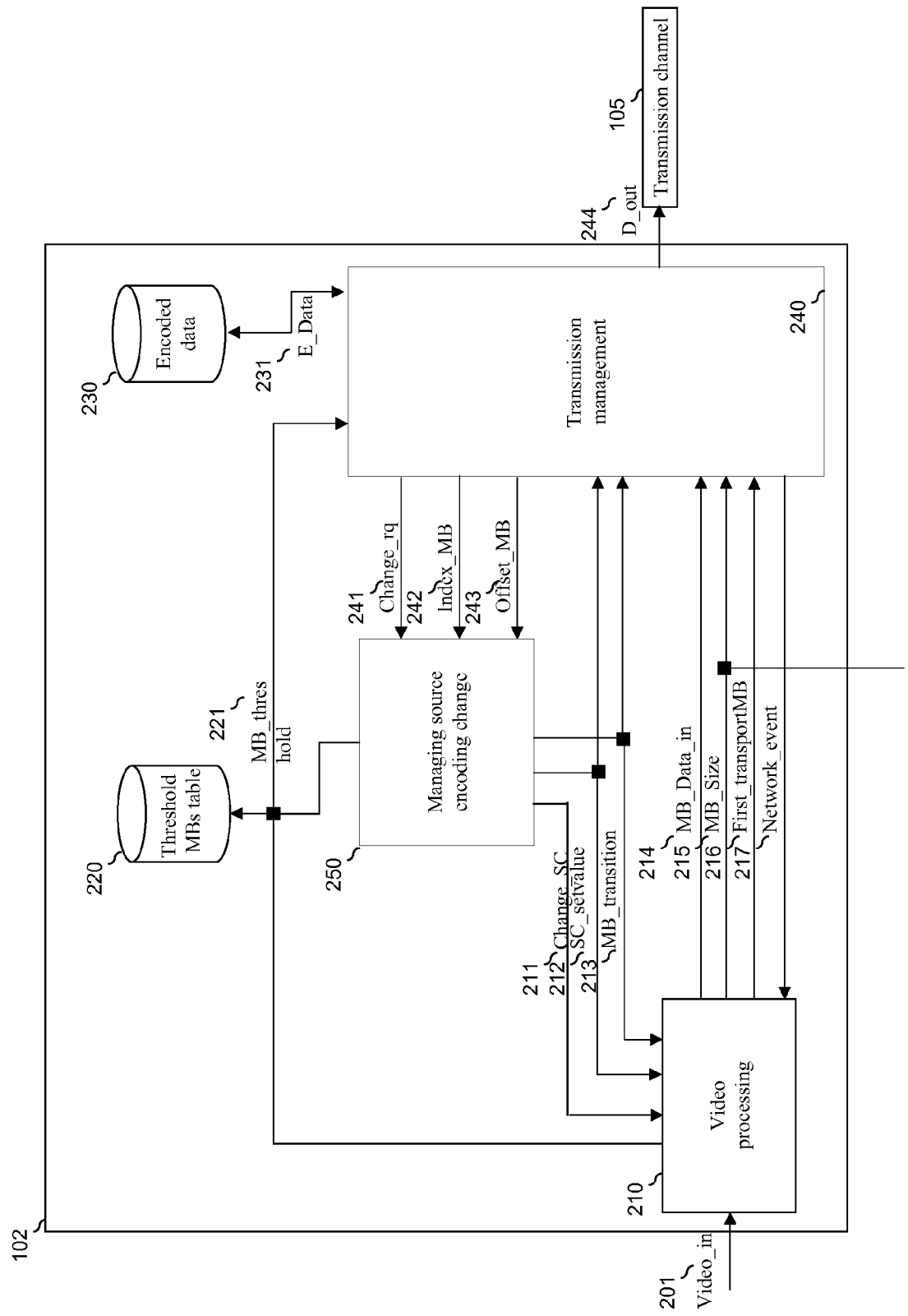
FIG. 2 shows an example of a sending device that implements mechanisms according to one particular embodiment of the invention.

FIG. 2 shows an example of a sending node that implements mechanisms according to a particular embodiment of the invention.

The sending node 102 is connected at input to an application for generating raw data (for example of the video type) (applications data blocks) through the interface Video_in 201 and is connected at output to the transmission channel 105 through the interface D_out 244. The sending node 102 is aimed at adapting the quantity of data produced by the application to the bandwidth allocated to the transmission channel for this application. The sending node 102 comprises:
- a video processing module 210, here below also called an encoder, designed to reduce the applications bit rate through compression, up to the bit rate capacity of the synchronous transmission channel 105;
- a transmission managing module 240;
- a source encoding change managing module 250.

The processing module 210 performs a data block compression. The processing module 210 therefore applies a source encoding to the raw data (for example video type data) given by the application, through the interface Video_in 201, as a function of a source encoding target value SC_setvalue 212 (or bit-rate target value) or any equivalent parameter (for example a type of transformation to be applied) coming from the source encoding change managing module 250. The processing module 210 then produces compressed macro-blocks (encoded data blocks) and gives them to the transmission managing module 240 through the interface MB_Data_in 214. The algorithm for applying source encoding by means of the processing module 210 is described here below with reference to FIG. 9.

As described here below with reference to FIG. 4, the processing module 210 is in charge of detecting a network event called network_event 217 (corresponding to a transportation period start event) generated by the transmission managing module 240. Upon detection of a network_event 217, the processing module 210 determines the maximum number of macro-blocks to be transmitted during the current transport period. To this end, the processing module 210 determines a macro-block, called a threshold macro-block. The maximum number of macro-blocks to be transmitted is attained when the threshold macro-block is reached. This threshold macro-block can be transmitted during the next transport period. The processing module 210 registers the threshold macro-block in a storage table 220 through the interface MB_threshold 221.

The transmission managing module 240, whose processing algorithm is described here below with reference to FIG. 7, receives the compressed macro-blocks through the interface MB_Data_in 214 and stores them in a storage unit 230 through the interface E_Data 231. The transmission managing module 240 uses a signal MB_size 215 coming from the processing module 210 to mark the boundaries between the macro-blocks before storing them. The transmission managing module 240 is also responsible for shaping the data to be transmitted on the transmission channel 105 through the interface D_out 244 and inserting a data block delimiter in the data stream to be transmitted, after each sending of a predefined number of macro-blocks. This predefined number of macro-blocks depends on the source encoding target value SC_setvalue 212. In one particular embodiment, the delimiter is a tile delimiter. A tile is a group of macro-blocks that cannot be decoded independently of one another (a macro-block is used as a predictor for the next macro-block). At the receiver device, it is necessary to wait for this delimiter to start decoding the entire tile.

The transmission managing module 240 is also in charge of determining the number of transport packets to be used for each transport period. This number is determined as a function of the number of macro-blocks to be transported per transport period and as a function of the threshold macro-blocks recorded in the storage table 220. The number of macro-blocks to be transported during the first transport period is received from the video processing module 210 through the signal First_transportMB 216. The first transport period is the transport period that includes the start of transmission of the encoded data blocks.

Figure 8:
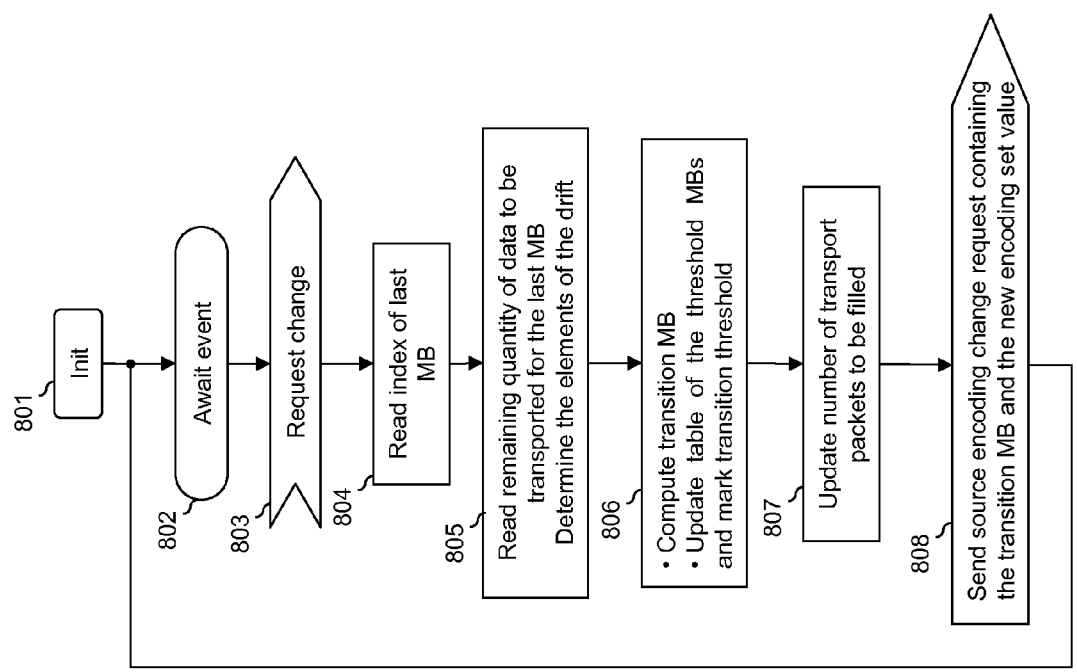
FIG. 8 presents a particular embodiment of a transition macro-block computation algorithm as implemented within a source encoding change managing module (included in the sending node of FIG. 2)

The source encoding change managing module 250, for which the processing algorithm is described here below with reference to FIG. 8, gives a source encoding target value SC_setvalue 212 to the processing module 210 by data blocks or by groups of data blocks. The source encoding target value SC_setvalue 212 is modified only in the event of reception of a change request Change_rq 241 coming from the transmission managing module 240. The transmission managing module 240 generates the change request Change_rq 241 in the event of a change in the transmission environment. For example, such a change can occur in the event of deterioration or improvement of the transmission conditions, in the event of declaration of new nodes having data to be transmitted, an elimination of (sender) nodes of the network etc. Thus, the transmission managing module 240 generates the request Change_rq 241 at each modification of the distribution of the bandwidth allocated to the application. The source encoding change managing module 250 is also in charge of determining the applications data block (also called a transition data block) on which the source encoding change must operate. The source encoding change managing module 250 gives the transition data block to the processing module 210 and to the transmission managing module 240 through the interface MB_transition 213. Thus, the transmission managing module 240 is capable of generating and inserting a source encoding change delimiter into the data stream to be transmitted. The pieces of information on transition data block (MB_transition 213) and on source encoding target value (SC_setvalue 212) are transmitted to the processing module 210 at the same time as a source encoding change request (change_SC 211). The source encoding change managing module 250 determines the transition data blocks from the index (or number) of the last macro-block transported or being transported (index_MB 242) and the remaining quantity of data to be transported for it (offset_MB 243).

Figure 3:
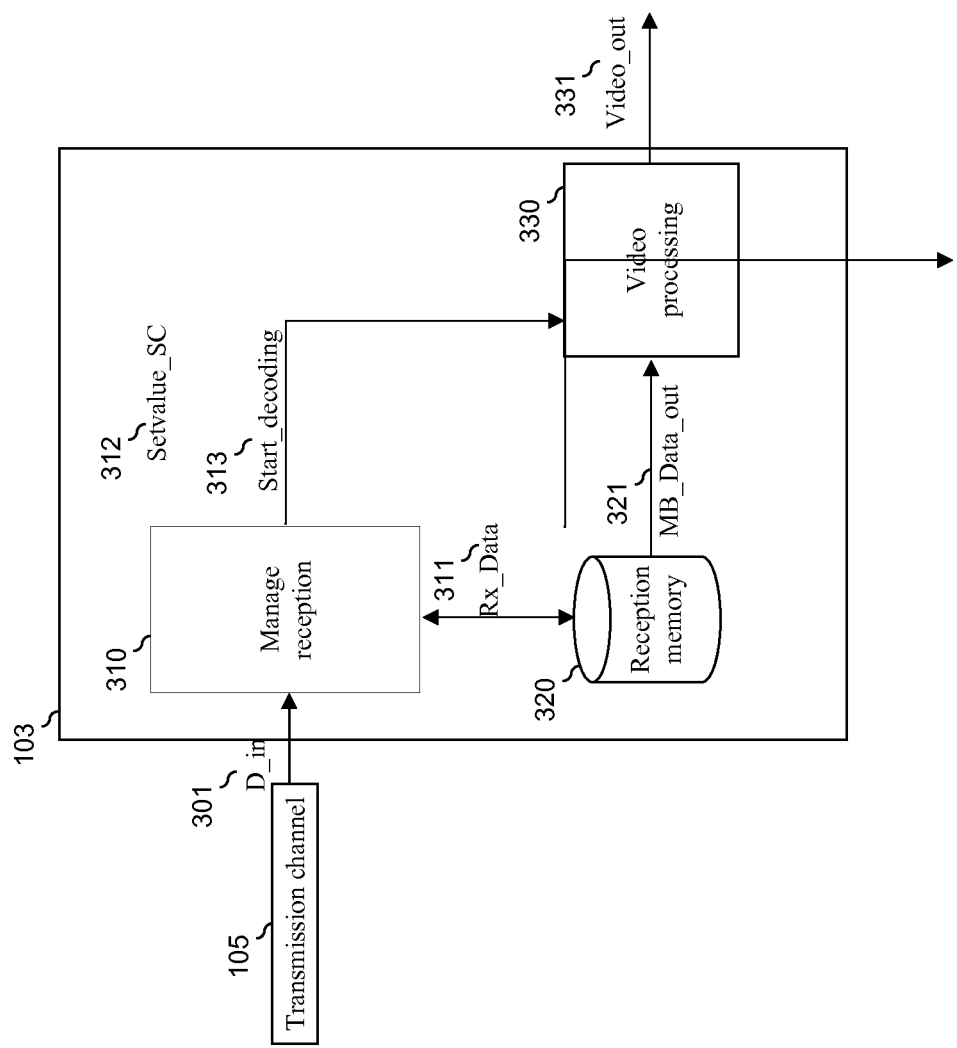
FIG. 3 presents an example of a receiving node that implements mechanisms according to one particular embodiment of the invention.

FIG. 3 shows an example of a receiving node which implements mechanisms according to one particular embodiment of the invention.

The receiving node 103 is connected to the output of the transmission channel 105 through the interface D_in 301 and a raw data consumer application (for example of the video type) through the interface Video_out 331. The purpose of the receiving node 103 is to decode the compressed data received from the transmission channel to give the raw data to the consumer application. The receiving node 103 comprises:
- a receiver management module 310 designed to process the compressed data received from the transmission channel and then store it in a storage unit 320 for which the access is obtained through the interface Rx_Data 311;
- a video processing module (decoder) 330.

The reception managing module 310 is responsible for analyzing the source encoding change delimiter in order to give a source encoding target value instruction_SC 312 to the processing module 330. The reception managing module 310 also gives the processing module 330 a start_decoding signal 313 informing it of the reception of a data block delimiter or the quantity of data corresponding to an encoded macro-block (as a function of the source encoding type). Upon reception of the signal start_decoding 313, the processing module 330 starts the decoding of the compressed data. The processing algorithm of the reception managing module 310 is described here below with reference to FIG. 10.

The processing module 330 (decoder) is designed to reconstitute the compressed data coming from the reception managing module 310. Thus, upon reception of the signal start_decoding 313, the processing module 330 reads the data stored in the processing unit 320 through the interface MB_Data_out 321. The processing module 330 decodes these pieces of data by applying the reverse transfer function (source decoding$^{-1}$) to the one applied by the encoder 210 of the sender node 102. To determine the right transfer function, the processing module 330 uses the source encoding target value setting_SC 312 given by the reception managing module 310. The processing module 330 reads the source encoding target value setting_SC 312 at each reception of the start_decoding signal 313 before starting to read the data stored in the storage unit 320.

The source encoding change managing module 250 and the transmission managing module 240 included in the sender node 102 as well as the reception managing module 310 included in the receiving node 103 are set up equally well on:
- a re-programmable computing machine (a PC, a DSP or a micro-controller) executing a program comprising an instruction sequence, or
- a dedicated computation machine (for example a set of logic gates such as an FPGA or an ASIC).

In the case of an embodiment of a module on a re-programmable computing machine, the corresponding program (i.e. the sequence of instructions) could be stored in a detachable storage medium (for example a floppy, a CD-ROM or a DVD-ROM) or non-detachable storage medium, this storage medium being partially or totally readable by a computer or a processor.

Referring here below to FIGS. 4, 5, 6 and 7, examples are provided of algorithms for implementing a mechanism for correcting differences in rate between the applications clock defining the applications data production clock rate and a network clock defining the applications data transmission clock rate for transmission through the transmission channel.

An implementation of the correction mechanism relies on the use of two counters. The first counter is in charge of counting the number of pieces of data produced by the applications layer. This first counter gets incremented at the rate of the applications clock (for example given through an HDMI (High Definition Multimedia Interface)). The second counter is in charge of counting the number of pieces of data transported by the transport layer. This second counter gets incremented at the rate of a multiple of the network clock or synchronously with the network clock. The values of the first and second counters develop with an initial shift or lag (here below called an overall initial latency) equal to the sum of the latency inherent in the system, i.e. the latency due to the processing time prior to transmission, i.e. due to the processing time for compression (encoding), in the example processed, of the pieces of data plus the time of transit of the data in the buffer memory, and a shift introduced by the system in order to permit an alignment of the data during a change in dynamic source encoding.

Thus, in comparing the values of the two counters, we obtain a difference, for a given transport period, between the number of applications data received by the sender node 102 and the number of encoded applications data transmitted by the sender node 102. In other words, we obtain the drift between the rate of production of the data by the application and the rate of transport of this data by the transport layer.

For example, here below in the description, it is assumed that the data block used for the comparison is the 16 by 16 format macro-block (a matrix of 16 rows by 16 pixels giving 256 pixels). Indeed, in the example of FIG. 1, the precision of the network clock, i.e. the jitter on the network event does not necessitate a precision of less than that of the 16 by 16 format macro-block.

In another embodiment, the data block used for comparison may be the 8 by 8 format macro-block or one pixel or a set of macro-blocks.

Figure 4:
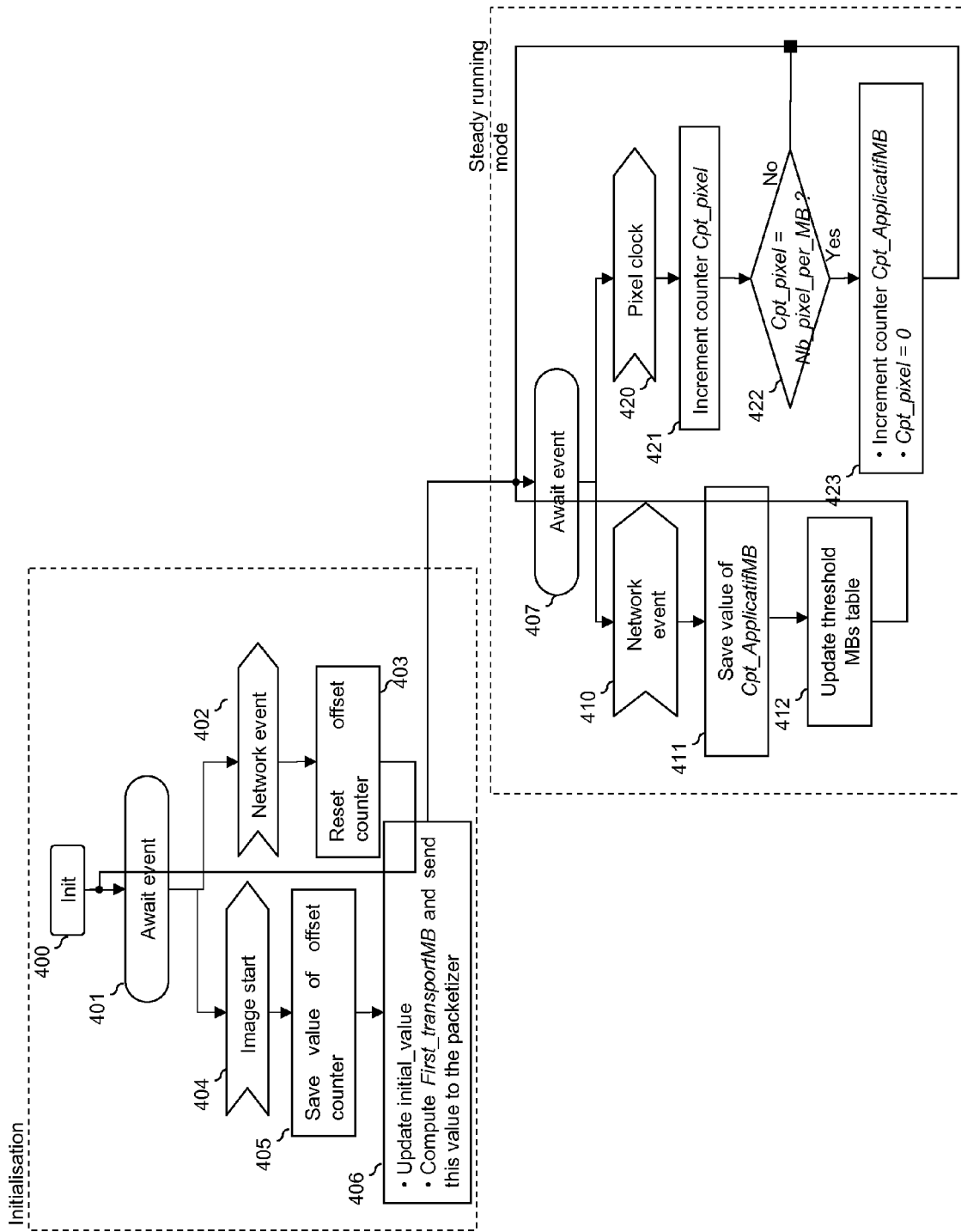
FIG. 4 presents a particular embodiment of a counting algorithm as implemented within a processing module (included in the sending node of FIG. 2)

FIG. 4 shows a particular embodiment of a counting algorithm as implemented within the processing module 210 (included in the sender node 102).

This counting algorithm comprises an initializing phase itself comprising the steps 400 to 406 and a phase of use in steady running mode itself comprising the steps 407 to 423.

Here below, we describe the steps 400 to 406 of the initializing phase.

At an initializing step 400, the following variables and counters are reset:
Cpt_pixel=0;
Cpt_ApplicatifMB=0;
Nb_pixel_per_MB=(LINE_SIZE×NB_LINE)/(NB_MB_PER_PICTURE);
Nb_AppMB_per_Period=(TransportPeriod/PicturePeriod)×NB_MB_PER_PICTURE;
Initial_value=½Nb_MB_per_Period;
First_transportMB=0;
MBthreshold=0;
Delta=0;
Offset=0.

Cpt_pixel is a pixel counter. It is incremented at the rate of the applications clock. As shall be seen here below (step 420 to 423 of FIG. 4), when the pixel counter reaches the value 256 (for a 16 by 16 format macro-block), the applications macro-block is incremented by one unit.

Cpt_ApplicatifMB is an applications macro-block counter used as a reference to match the transport rate.

The variable Nb_pixel_per_MB is a constant related to the format of the input video and to the number NB_MB_PER_PICTURE of macro-blocks per image for this video. The format of the input video is characterized by a number of lines NB_LINE (for example 750 lines for a 720 p format) and a number of pixels per line LINE_SIZE (for example 1650 pixels for a 720 p format). Thus the variable Nb_pixel_per_MB represents the ratio between the total number of pixels for an image and the total number of macro-blocks.

The variable Nb_AppMB_per_Period corresponds to the number of macro-blocks produced by the application per transport period. Thus the variable Nb_AppMB_per_Period corresponds to the number of macro-blocks per image (PicturePeriod which corresponds to the number of images per second or <<frame rate>>) reduced to the duration of a transport period TransportPeriod.

The variable Initial_value (expressed in number of macro-blocks) corresponds to the time needed to enable the system to compute the transition macro-block during a change in source encoding. It can be noted that a judicious choice of the value of the variable Initial_value minimizes the bandwidth allocation necessary for the source encoding change, and therefore minimize the quantity of padding data needed to align the transport of the transition macro-block with a start of a transport period. Thus, a judicious choice of the value of the variable Initial_value makes the system more reactive, i.e. it is possible to minimize the duration between the instant of generation of the source encoding change request and the instant at which this change is effective.

The variable First_transportMB corresponds to the number of macro-blocks to be transported during the first transport period.

The variable MBthreshold (described here below with reference to FIG. 7) corresponds to the index of the threshold macro-block of a given transport period. In other words, the variable MBthreshold indicates, for the given transport period, the macro-block as of which the transport layer must no longer transport any other macro-block.

The variable Delta corresponds to a number of macro-blocks that may be added to or deducted from the variable MBthreshold to diminish or increase the constraint on the transport of the macro-blocks. Thus, the variable Delta makes it possible to define a new threshold macro-block for which the index is greater than or smaller than the pre-defined threshold macro-block (MBthreshold). For example, when the size of the macro-blocks, in the context of a variable bit-rate compression is smaller than the target size (for example the mean value of size on a given period corresponding to the mean value of the bit rate or the maximum value of this size) on zones of low complexity, the addition of the variable Delta to the variable MBthreshold enables the transport layer to transport more macro-blocks than had been initially dictated. In other words, the sum of the differences (or variations) of the encoded macro-blocks, relative to a target value of macro-block size on a transport period is at least equal to this target value of macro-block size; it is therefore possible to transport an additional macro-block instead of a piece of padding data. It can also be necessary to apply a negative Delta (zones of high complexity on a transportation period). In this way, the number of pieces of padding data transported is reduced and the constraint on the compression algorithm in zones of high complexity is diminished. This makes it possible to return to a position of equilibrium between the number of macro-blocks produced and the number of macro-blocks transported. Thus, for a constant allocated bandwidth, the number of macro-blocks transmitted can be different per transportation period but the mean of the number of macro-blocks transmitted on a given number of transportation periods remains constant. This can be useful when the source encoding gives macro-blocks of variable size depending on their complexity. As shall be seen here below, this value Delta is stored in the storage table 220 and is used by the source encoding change management module 250 to determine the transition macro-blocks during a change in source encoding.

The variable Offset corresponds to the temporal difference between the instant of detection of an image start event and the instant of detection of a network_event 217 that precedes it. It must be noted that when starting, a network_event 217 occurs before an image start event.

After the initializing step 400 the operation passes to a step 401 of waiting for a network_event 217 (marking the start of a transport period) or an image start event.

Upon detection of a network_event 217 (step 402), the operation goes to the reinitializing (zero setting) of an offset counter (step 403). This offset counter is incremented at the rate of the network clock. Then there is a return to the waiting state 401.

Upon detection of an image start event (step 404), the processing module 210 records the value of the offset counter (Offset variable) (step 405), before passing to the step 406. At the step 406, the operation updates the variable Initial_value as a function of the value of the variable Offset recorded and computes the variable First_transportMB (as described here above). Then, the variable First_transportMB is transmitted to the transmission managing module 240.

The variable First_transportMB is determined (step 406) by the following formula (where the symbol "%" represents the "modulo" operation):

$$\text{First\_transportMB} = ((\text{TransportPeriod} - \text{offset}) \times Nb\_AppMB\_per\_Period + \text{Initial\_value})\%(\text{TransportPeriod} \times Nb\_AppMB\_perPeriod)$$

It can be noted that the variable First_transportMB has little influence on the overall initial latency of the system. It can be noted that the variable First_transportMB has influence on the overall initial latency of the system. Indeed if at the end of the initial latency inherent in the system, the remaining time of the first transportation period does not make it possible to transport the number First_transportMB of macro-blocks (determined during the initializing), then there is wait for the next transport period (additional latency) to transport the First_transportMB macro-blocks or the value of the variable Initial_value is modified to obtain a new number First_transportMB of macro-blocks which may be transmitted during the remaining time of the first transport period. Thus, the value of the variable Initial_value can be increased or reduced (within the limit of the computation time needed for the choice of the transition macro-block) so as to obtain a value First_transportMB adapted to the initial latency inherent in the system. The increase in the value of the variable Initial_value will have the consequence of increasing the reaction time during a change in source encoding.

We shall now describe the steps 407 to 423 of the phase of use in steady running mode.

After the step 406, the operation passes to a step 407 of waiting for a network_event 217 or an applications clock event.

Upon detection of a network_event 217 (step 410), the processing module 210 records the value of the applications macro-block counter Cpt_ApplicationsMB (step 411), before passing to the step 412. At the step 412, the variable MBthreshold, i.e. the index of the threshold macro-block for the current transport period, is computed and this index is written in the storage table 220, through the interface MB_threshold 221.

The index of the threshold macro-block is obtained by adding the value of the applications macro-block counter Cpt_ApplicationsMB (recorded at the step 411) and the value of the variable Initial_value determined during the initializing.

At this same step 412, a variable Delta is defined, for example as a function of the size of the last encoded macro-blocks produced, for the variable MBthreshold, and then this variable Delta is written in the storage table 220. It may be recalled that this variable Delta corresponds to a number of macro-blocks which can be added to or deducted from the variable MBthreshold (to reduce or increase the constraint on the transport of the macro-blocks).

It can be noted that the depth of the storage table 220 depends on the overall initial latency relative to the transport period. For example, if the overall initial latency is greater than one transport period but smaller than two transport periods, then the depth of the storage table 220 is equal to the size of two macro-blocks. The depth of the table corresponds to the overall initial latency value in terms of numbers of transport periods rounded out to the next higher integer (NB_period).

After the step 412, there is a return to the waiting state 407.

Upon detection of an applications clock event (step 420), the pixel counter Cpt_pixel is incremented by one unit (step 421). Then, a test is performed (step 422) to determine whether the value of the pixel counter Cpt_pixel is equal to the number Nb_pixel_per_MB of pixels per macro-block. If the value of the pixel counter Cpt_pixel is equal to the number Nb_pixel_per_MB, then the pixel counter Cpt_pixel is reset at zero and the macro-block counter Cpt_applicationsMB is incremented by one unit (step 423) and then there is a return to the waiting state 407. If not, a return is directly made to the waiting state 407.

Figure 5:
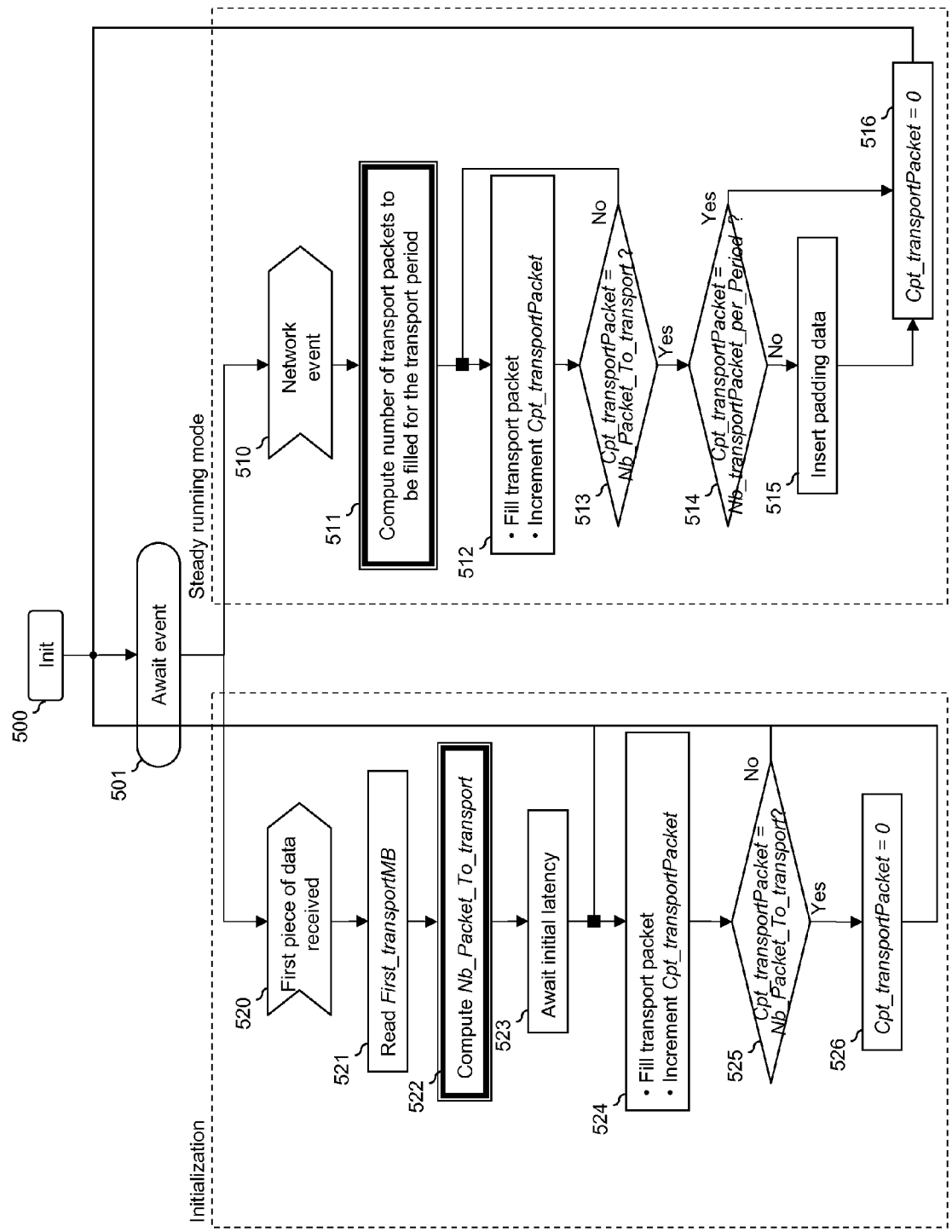
FIG. 5 presents a particular embodiment of a data packetizing algorithm as implemented within the transmission managing module (included in the sending device of FIG. 2)

FIG. 5 presents a particular embodiment of a data packetizing algorithm as implemented within the transmission managing module 240 (included in the sending node 102).

At an initialization step 500, the following variables and counters are initialized:
Nb_transportPacket_per_MB=0;
Nb_transportPacket_per_Period=0;
Cpt_transportPacket=0;
Nb_Packet_To_transport=0;
Cpt_TransportMB=0;

The variable Nb_transportPacket_per_MB corresponds to the number of transport packets needed to transfer a macro-block (after encoding or after compression) to the receiving node 103. The variable Nb_transportPacket_per_MB depends on the format of the input video, the number NB_MB_PER_PICTURE of macro-blocks per image for this video, the encoding (compression) applied to the applications data (and therefore on the bandwidth allocated to the application) and the size of the transport packets. For example, for a 720 p video, i.e. 1280 active pixels per line by 720 active lines with 16 by 16 macro-blocks and one compression of 444 to 420 (passing from 24 bits per pixel to 12 bits per pixel), 64 transport packets of 48 bits each are needed ($64 \times 48 = 16 \times 16 \times 12$).

The variable Nb_transportPacket_per_Period corresponds to the number of transport packets allocated to the application per transport period. This variable Nb_transportPacket_per_Period therefore represents the bandwidth allocated to the application per transport period. This variable Nb_transportPacket_per_Period depends on the transport period, the format of the input video, the encoding (compression encoding) applied to the applications data (and therefore the bandwidth allocated to the application expressed in bits per second) and the size of the transport packets. For example, for a 720 p video with 60 frames per second and a 4:4:4 to 4:2:0 type compression by elimination of chrominance information, and with a transport period of one millisecond, 13824 transport packets of 48 bits each ($1280 \times 720 \times 60/4 \times 1000$: number of active pixels per line $\times$ number of active lines $\times$ 60 frames per second/ratio between number of bits per pixel and number of bits per transport packet $\times$ the inverse of the transport period) are needed.

Cpt_transportPacket is a transport packet counter.

The variable Nb_Packet_To_transport corresponds to the number of packets to be transported for the current transport period. As shall be seen here below, this variable is used by the transmission managing module 240.

Cpt_TransportMB is a counter of transported macro-blocks. Each threshold macro-block stored in the storage table 220 represents a target value of macro-blocks not to be exceeded by the counter Cpt_TransportMB for a given transportation period. This counter is incremented at each boundary between two macro-blocks during the packetization process.

After the initializing step 500, the operation passes to a step 501 of waiting for the first piece of data to be transported or for a network_event 217 (marking the start of a transport period).

Here below, we describe the steps 520 to 526 pertaining to an initialization phase.

Upon reception of the first piece of data to be transported (step 520), the operation carries out the reading (step 521) of the variable First_transportMB (computed and transmitted by the processing module 210) corresponding to the number of macro-blocks to be transported during the first transport period. The first transportation period starts after the overall initial latency.

At the step 522, the number of transport packets needed to transport the First_transportMB macro-blocks is determined. This step 522 is described in detail here below with reference to FIG. 6.

At the step 523, there is a wait for the end of a duration corresponding to the overall initial latency. This duration is expressed as a sub-multiple of the transport period.

At the step 524, the transmission managing module 240 fills the first transport packet. At this same step 524, the transport packet counter Cpt_transportPacket is incremented by one unit.

At the step 525, a test is performed to determine whether the value of the transport packet counter Cpt_transportPacket is equal to the packet number Nb_Packet_To_transport to be transported for the first transport period. If the value of the transport packet counter Cpt_transportPacket is equal to the Nb_Packet_To_transport then the transport packet counter Cpt_transportPacket is reset (step 526) and then there is a return to the waiting state 501. If not, there is a return to the step 524 for filling the next transport packet.

Here below, a description is provided of the steps 510 to 516 pertaining to a phase of use in steady running mode.

Upon detection of a network_event 217 (step 510), the transmission managing module 240 determines the number Nb_Packet_To_transport of packets to be transported during the current transportation period (step 511).

At the step 512, the transmission managing module 240 fills the first transport packet. At this same step 512, the transport packet counter Cpt_transportPacket is incremented by one unit.

At the step 513, a test is performed to determine whether the value of the transport packet counter Cpt_transportPacket is equal to the number Nb_Packet_To_transport of packets to be transported for the current transport period. If the value of the transport packet counter Cpt_transportPacket is equal to the number Nb_Packet_To_transport, then the step 514 is performed. If not, the operation returns to the step 512 to fill the next transport packet.

At the step 514, a test is performed to determine whether all the transport packets allotted to the application have been filled for the current transport period. In other words, a check is made to determine whether the bandwidth allocated to the application has been entirely used. If all the transport packets have been filled, then the transport packet counter Cpt_transportPacket is reset (step 516), and then the operation returns to the waiting step 501. If one or more unfilled transport packets are detected, then pieces of padding data are added to fill out the unfilled transport packet or packets (step 515) and then the transport packet counter Cpt_transportPacket is reset (step 516) and there is a return to the waiting step 501.

Figure 6:
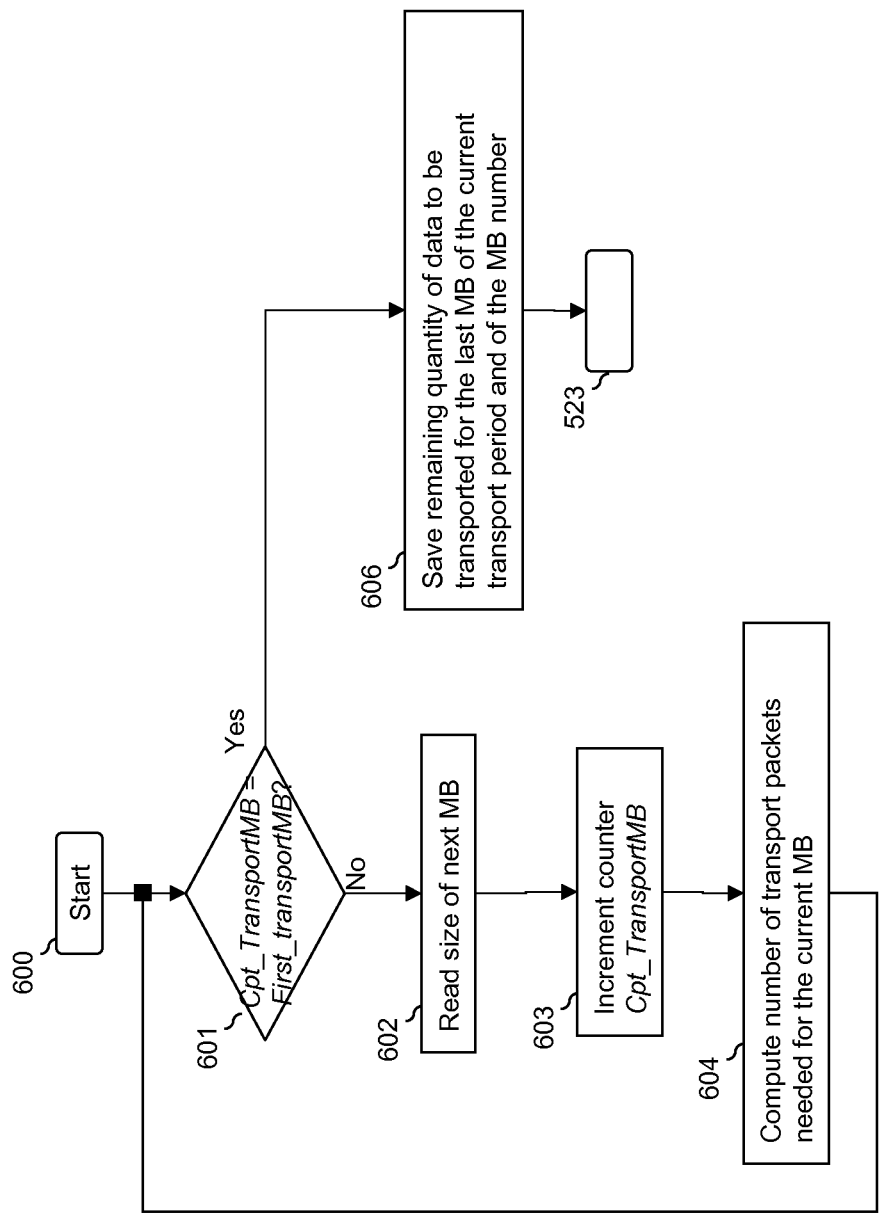
FIG. 6 presents a particular embodiment of the step 522 of FIG. 5 (data packetizing algorithm)

Referring now to FIG. 6, a particular embodiment is presented of the step 522 of FIG. 5 (data packetizing algorithm performed by the sender node).

After starting (step 600) a test is performed (step 601) to determine whether the value of the counter of transported macro-blocks Cpt_TransportMB is equal to the number First_transportMB of macro-blocks to be transported during the first transport period.

If the value of the counter of transported macro-blocks Cpt_TransportMB is smaller than the number First_transportMB, then the size of the next macro-block is read (step 602), and the next macro-block becomes the current macro-block during a next iteration. Then, the counter of transported macro-blocks Cpt_TransportMB is incremented by one unit (step 603). Then, the number of transport packets needed to transport the current macro-block (step 604) is determined and a return is made to the test of the step 601.

If the value of the counter of transported macro-blocks Cpt_TransportMB is equal to the number First_transportMB, then the transmission managing module 240 records the remaining quantity of data to be transported for the last macro-block of the first transport period, as well as the index (or number) of this last macro-block (step 606). For example, if First_transportMB=12.8 and if the size of the $13^{th}$ macro-block is 6144 bits, the index of the last macro-block is 13 and the remaining quantity of data to be transported is 1228 bits (6144−6144×0.8). After the step 606 has been executed, the operation passes to the step 523 (FIG. 5).

Figure 7:
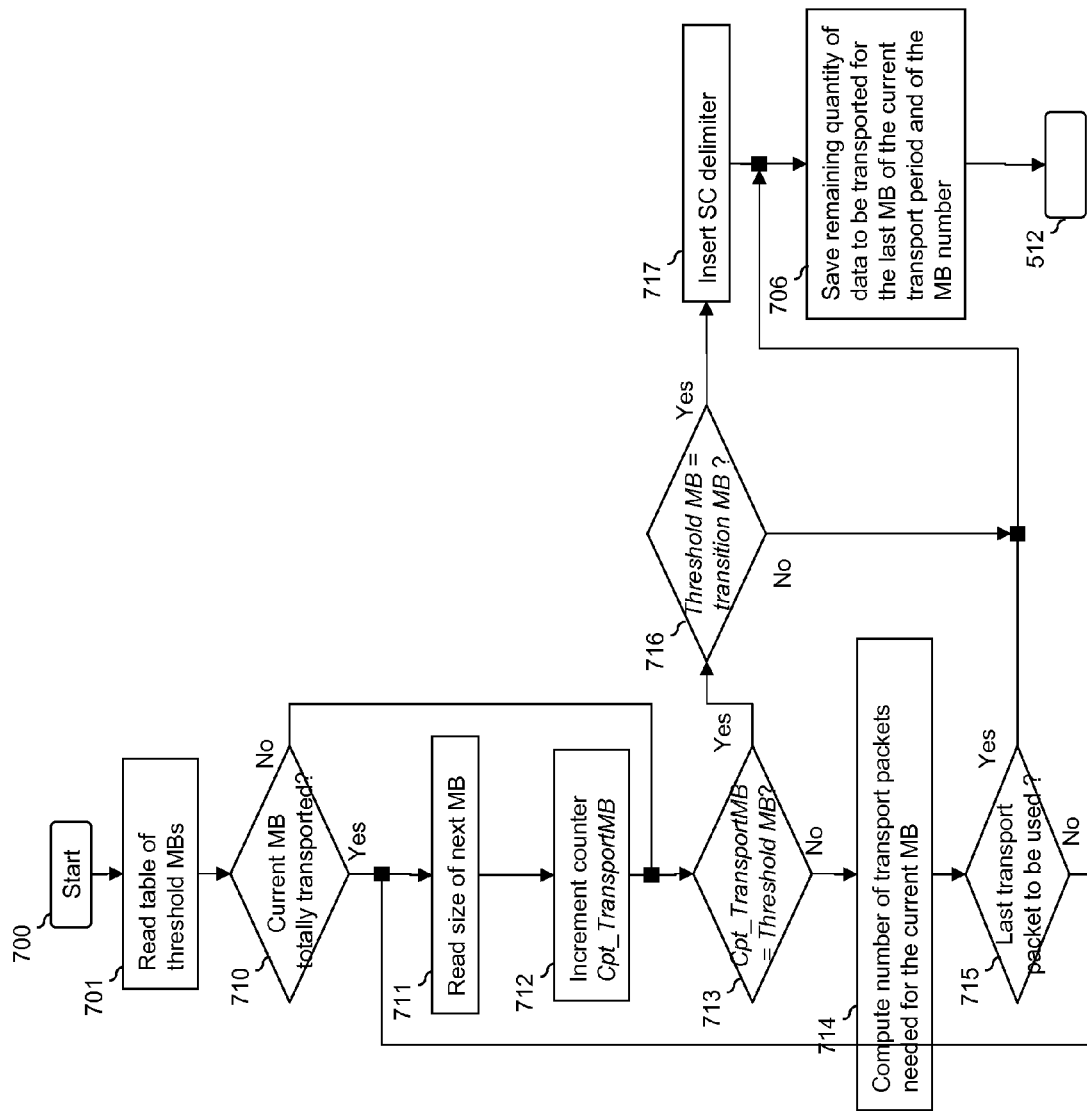
FIG. 7 presents a particular embodiment of the step 511 of FIG. 5 (data packetizing algorithm)

Referring to FIG. 7, a particular embodiment is presented of the step 511 of FIG. 5 (the data packetizing algorithm performed by the sender node).

After starting (step 700) the storage table 220 is read in order to obtain the threshold macro-block for the current transport period (step 701).

At the step 710, a test is made to determine whether the current macro-block has been totally transported. Thus, at this step 710, a check is made to see if the remaining quantity of data to be transported for the last macro-block of the current transport period (recorded at the step 606 and 706) is equal to zero. If the current macro-block has been totally transported then, before passing to the step 713, the size of the next macro-block is read (step 711) (the next macro-block becoming the current macro-block during a next iteration) and the counter of transported macro-blocks Cpt_TransportMB is incremented by one unit (step 712). If not, the operation passes directly to the step 713.

At the step 713, a test is performed to determine whether the value of the counter of transported macro-blocks Cpt_TransportMB is equal to the index of the threshold macro-blocks obtained by reading the storage table 220 at the step 701.

If the value of the counter of transported macro-blocks Cpt_TransportMB is equal to the index of the threshold macro-block, then the step 716 is performed.

If the value of the counter of transported macro-blocks Cpt_TransportMB is smaller than the index of the threshold macro-blocks, then the number of transport packets needed to transport the current macro-block (step 714) is determined. Then, a test is performed (step 715) to check on whether the last transport packet for the current transport period is used to transport the current macro-block. In the event of a positive check, the step 706 is performed. If not, the operation returns to the step 711 to read the size of the next macro-block.

At the step 716, a test is performed to check on whether the threshold macro-block corresponds to the transition macro-block. If the threshold macro-block corresponds to the transition macro-block, then the transmission managing module 240 generates and inserts a source encoding change delimiter into the data stream to be transmitted (step 717), and then it performs the step 706. If not, it directly performs the step 706.

At the step 706, the transmission managing module 240 records the remaining quantity of data to be transported (as described here above with reference to FIG. 6) for the last macro-block of the current transport period, as well as the index (or number) of this last macro-block.

After execution of the step 706, the operation passes to the step 512 (FIG. 5).

During a change in bandwidth allocation allocated to the application, the source encoding (i.e. the compression rate applied to the applications data) must be adapted so as to preserve sufficient transportation capacity. To prevent quality of service problems (i.e. to maintain constant end-to-end latency), the system must synchronize the source encoding change and the effective bandwidth change. The system must therefore align the data block to which the new source encoding and the change in bandwidth are applied. To this end, upon reception of a request for a chance in source encoding (Change_rq 241), the system computes the transition data block (or transition macro-block) in taking account of the overall initial latency and the drift in ratio between the number of applications data blocks produced by the application and the number of applications data blocks transmitted after encoding by the transport layer.

FIG. 8 presents a particular embodiment of a transition macro-block computing algorithm as implemented within the source encoding change managing module 250 (included in the sending node 102).

During an initialization step 801, the following variables (described with reference to FIG. 5) are initialized:

Nb_transportPacket_per_MB;
Nb_transportPacket_per_Period.

After the initialization step 801, the operation passes to a step 802 of waiting for a source encoding change request Change_rq 241.

Upon reception of a source encoding change request Change_rq 241 (step 803), the source encoding change managing module 250 obtains the index of the last macro-block transported during the previous transport period through the interface index_MB 242 (step 804) and the remaining quantity of data to be transported for this last macro-block through the interface offset_MB 243 (step 805). This step then determines the value Q1 and the value drift_per_period used in the formula here below at the step 806. Thus, a drift is determined between a number of applications data blocks received and a number of applications data blocks transmitted after encoding.

At the step 806, the transition macro-block on which the source encoding change must be performed is computed. The transition macro-block is determined by the following formula:

Index MB+Q1+(NB_period×(Nb_AppMB_per_Period+drift_per_period))+Delta where

IndexMB corresponds to the index of the last macro-block of the previous transport period;

Q1 corresponds to the quantity of transported data of this last macro-block during the previous transport period. Q1 is defined as the size of the last macro-block minus the remaining quantity of data to be transported. The value Q1 is then an indicator of the accumulated total of the drifts of the previous transport periods;

NB_period corresponds to the duration of the overall initial latency divided by the duration of the transport period rounded out to the next higher value;

Nb_AppMB_per_Period corresponds to the number of macro-blocks per image reduced to the duration of one transport period TransportPeriod;

drift_per_period corresponds to the drift between the number of macro-blocks produced by the application and the number of macro-blocks transported per transport period; and Delta corresponds to the number of macro-blocks used to adjust the variable MBthreshold and therefore the maximum number of macro-blocks to be transmitted during a given transport period. If the value Delta has been added to the variable MBthreshold, then this same value Delta will be taken into account in computing the transition macro-block.

As described here below with reference to FIG. 13, the transition macro-block is aligned with a start of a transport period so as to synchronize the change in source encoding and the effective bandwidth change.

Then, at this same step 806, the source encoding change managing module 250 updates the storage table 220 in replacing the indices of the threshold macro-blocks by the computed transition macro-block index. Thus any possible drift correction is prevented from happening. The transition macro-block is identified in the storage table 220 by means of a supplementary bit.

At the step 807, the source encoding change managing module 250 updates the number of packets to be transported for the current transport period (Nb_Packet_To_transport). An updating of this kind (a modification of the variable Nb_Packet_To_transport) makes it possible to:

align the transition macro-block with the start of the next transport period, if the initial latency duration is smaller than the duration of a transport period; or cancel a possible drift correction which would have offset the transition macro-block and therefore distorted the alignment of this transition macro-block with a start of a transport period.

At the step 808, the source encoding change managing module 250 transmits a source encoding change request (change_SC 211) to the process module 210, this request being accompanied by a source encoding target value (SC_setvalue 212) and the index of the transition macro-block computed at the step 806 (MB_transition 213). Then, the operation returns to the waiting state 802.

Figure 9:
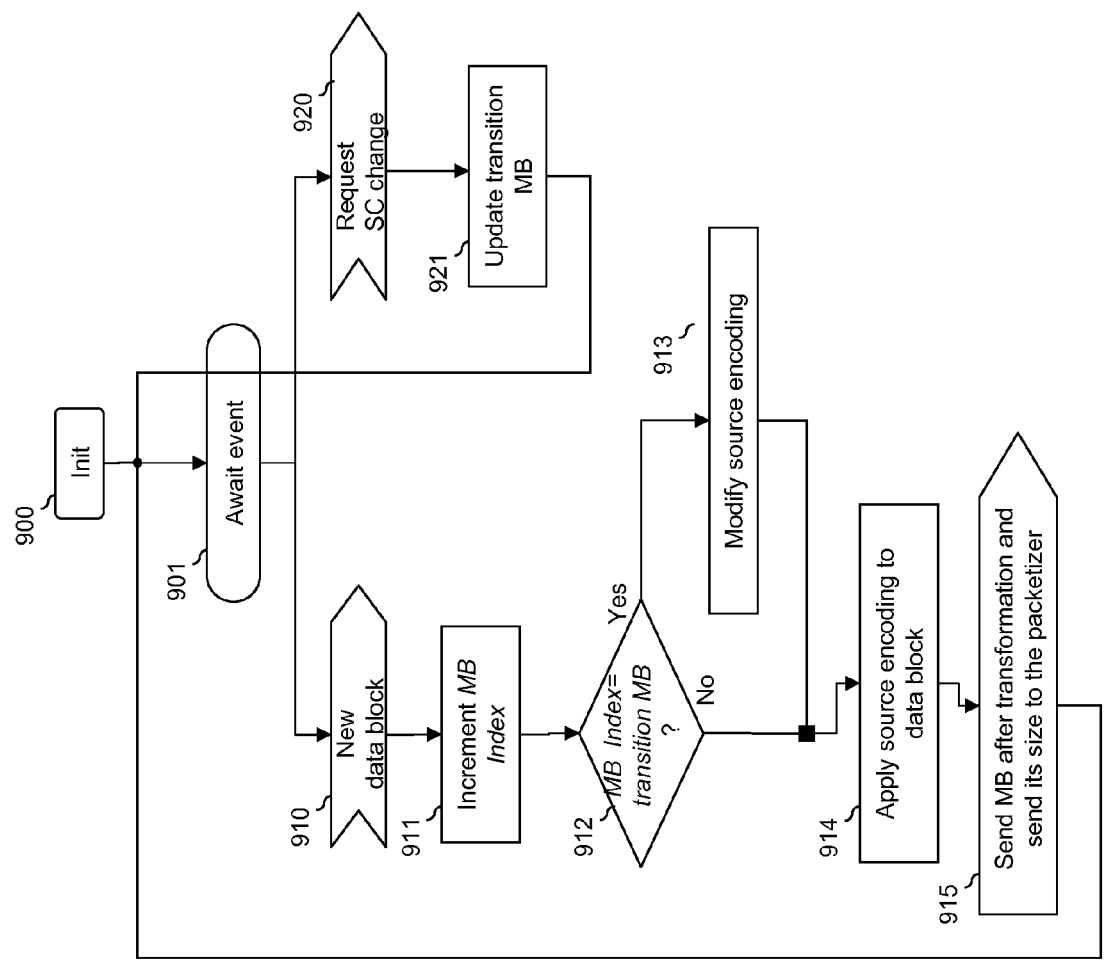
FIG. 9 presents a particular embodiment of a source encoding application algorithm according to a given rate of efficiency as implemented within the processing module (included in the sending node of FIG. 2)

FIG. 9 presents a possible embodiment of a data encoding algorithm as implemented within the video processing transport module 210 (included in the sending node 102).

At an initialization step 900, a first source encoding to be applied to the raw data (for example video type data) given by the application is defined.

After the initialization step 900, the operation passes to a step 901 of waiting for a source encoding change request or a data block (macro-block) to be encoded.

Upon reception of a source encoding change request change_SC 211 (step 920), the video processing module 210 obtains the index of the transition macro-block (step 921) computed at the step 806. Then, the operation returns to the waiting step 901.

Upon detection of a data block to be encoded (step 910), the index of the current macro-block is incremented by one unit (step 911). Then, a test is made to determine whether the index of the current macro-block is equal to the index of the transition macro-block (step 912).

If the index of the current macro-block is equal to the index of the transition macro-block, in other words if the current macro-block is the transition macro-block, then the source encoding to be applied to the data coming from the application (step 913) is modified, i.e. the operation passes from the first source encoding to the second source encoding defined by the piece of information SC_setvalue. The pieces of data are then encoded according to the second source encoding (step 914) including the transition macro-block. Then the step 915 is performed.

If the index of the current macro-block is different from the index of the transition macro-block, then the pieces of data are encoded according to the first source encoding (step 914). Then the step 915 is performed.

At the step 915, the video processing module 210 sends the transmission managing module 240 the compressed macro-block (encoded data) and a piece of information on the size of the compressed macro-block. Then, the operation returns to the waiting state 901.

Figure 10:
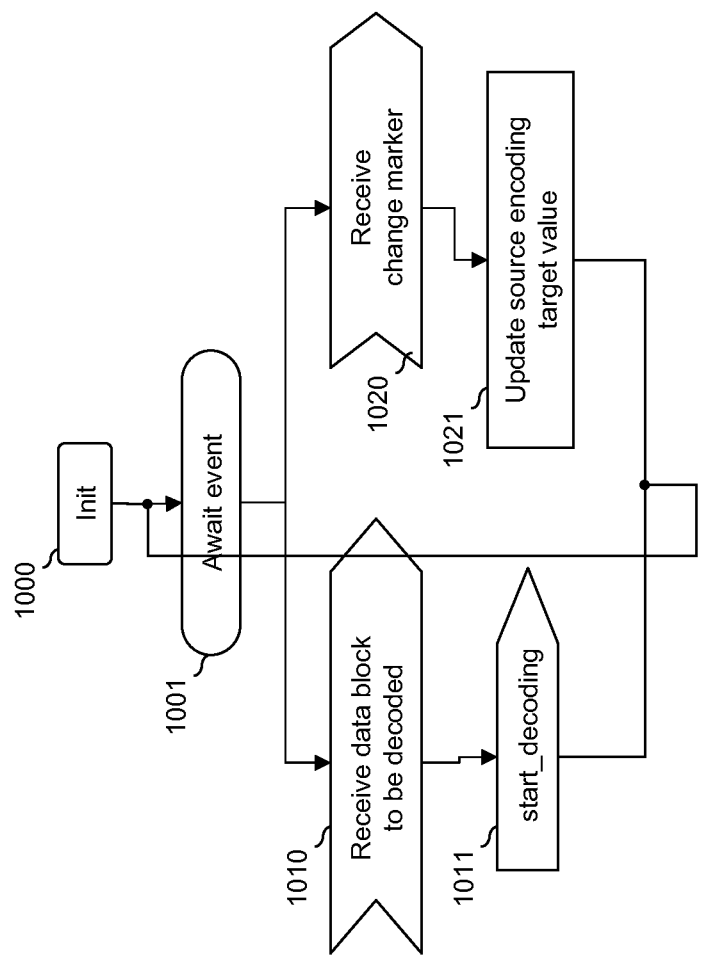
FIG. 10 presents a particular embodiment of an algorithm for processing data block delimiters and source encoding change delimiters as implemented within a module for managing reception (included in the receiving device of FIG. 3)

FIG. 10 presents a particular embodiment of an algorithm for processing data block delimiters and source encoding change delimiters as implemented within the reception managing module 310 (included in the receiving node 103).

After an initialization step 1000, the operation passes to a step 1001 of waiting for an event of receiving a data block delimiter or a source encoding change delimiter.

Upon reception of a data block delimiter (step 1010), the reception managing module 310 (step 1011) sends the processing module 330 a signal start_decode, 313 in order to allow this module to start reading and decoding compressed data stored in the storage unit 320. Then the operation returns to the waiting state 1001.

Upon reception of a source encoding change delimiter (step 1020), the source encoding target value SC_setvalue 312 given to the processing module 330 is updated (step 1021). Then a return is made to the waiting state 1001.

It must be noted that, when the system is started, the reception managing module 310 first of all receives a source encoding change delimiter indicating the first processing operation to be performed and then receives the first data block delimiter which makes it possible to activate the data decoding.

FIG. 11 illustrates an example of a storage table 220 included in the sending node 102.

Each row of the storage table 220 corresponds to a transport period.

The first column 1100 of the storage table 220 indicates the index of the threshold macro-block or the index of the transition macro-block for a given transport period, according to the value contained in the second column 1101. Thus, when the second column 1101 contains the value 0, it means that the first column 1100 contains the index of the threshold macro-block. By contrast, when the second column 1101 contains the value 1, it means that the first column 1100 contains the index of the transition macro-block. The threshold macro-block is determined by the process module 210 at each start of a transport period. The transition macro-block (i.e. the applications macro-block on which the change in source encoding must be done) is determined by the source encoding change managing module 250 at each modification of the distribution of the bandwidth allocated to the application.

The third column 1102 of the storage table 220 indicates a number Delta of encoded data block to be added or to be deducted from the number MB_threshold to reach the "normal" value of MBthreshold. This indication is used by the source encoding change managing module 250 when the transition MB is computed. This value of Delta reduces or increases the constraint on the transport layer in a localized way and therefore reduces the constraint on the compression algorithm implemented by the video processing module 210.

Figure 12:
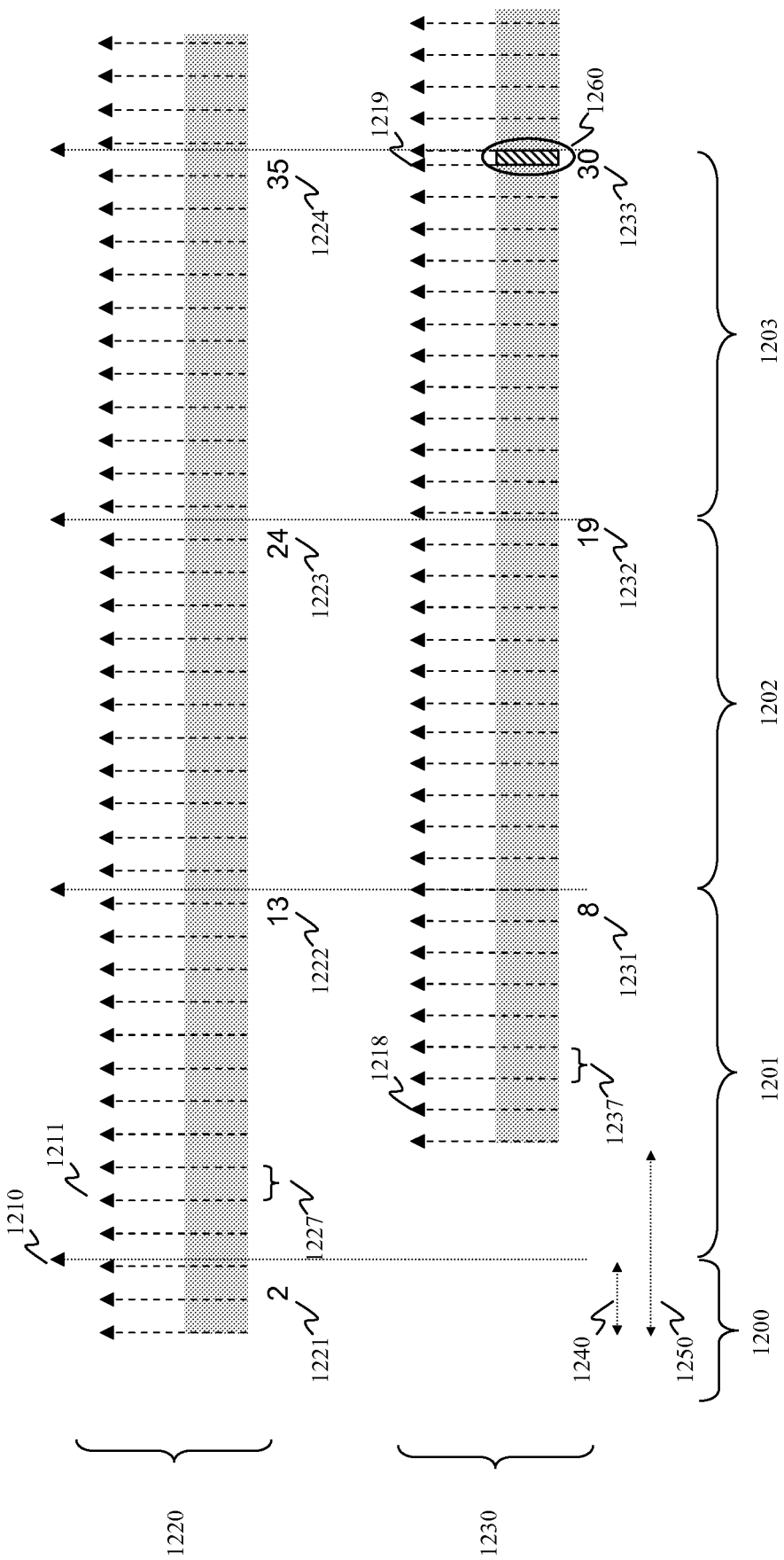
FIG. 12 is a schematic illustration of the principle of a particular embodiment of the invention through an example of correction of a drift between a data production rate and a rate of transport of this data.

FIG. 12 is a schematic illustration of the principle of one particular embodiment of the invention through an example of correction of a drift between the rate of data production by the applications layer and the rate of transport of this data by the transport layer.

The FIG. 12 can be sub-divided into a top part and a bottom part referenced 1220 and 1230 respectively.

The top part 1220 illustrates the generation (at the applications layer) of the data blocks (macro-blocks) encoded by the application of a source encoding to the raw applications data given by the application. The top part 1220 comprises four time slots 1200 (shown partially), 1201, 1202 and 1203 corresponding to four encoding slots. The start of each encoding slot is aligned with a network event 1210. Each encoding slot has the same duration as a transport period and is designed to clock the encoding of the data to be transported during a transport period.

In the application shown, the application starts giving applications data blocks (for example of a video type) during the period 1200. Each start of an applications data block is represented by a dashed arrow 1211. Each block of raw applications data is given by the application at time slots having a duration equal to the period 1227 which corresponds, for a macro-block with a format 16 by 16, to 256 events generated by the applications clock.

A counter Cpt_ApplicationsMB (described in with reference to FIG. 4) counts the macro-blocks produced by the application. This counter Cpt_ApplicationsMB is incremented at the end of each period 1227, and the value of this counter is registered in a table at the end of each network event 1221, 1222, 1223 and 1224.

The bottom part 1230 illustrates a transport sequence (at the transport layer) for transporting the encoded data blocks (macro-blocks).

The network event 1210 is represented such that it is common to the bottom part 1230 and the top part 1220 of FIG. 12. Thus, the four time periods 1200 (a period that is partially represented), 1201, 1202 and 1203 also correspond to four transport periods. Each start of a block of encoded data is represented by a dashed arrow 1218. Each block of encoded data is transmitted by the transport layer during a transport sub-period 1237. A transport period is used to transport a given number of macro-blocks. The transport period of a macro-block is called a transport sub-period.

A counter Cpt_TransportMB (described with reference to FIGS. 5, 6 and 7) counts the encoded macro-blocks transported by the transport layer. This counter Cpt_TransportMB is incremented at the end of each transport sub-period 1237 and the value of this counter is recorded in a table at the end of each transport period 1231, 1232 and 1233.

As described with reference to FIG. 4, in an initialization phase, the system computes the value of the variable Initial_value. In the example illustrated, the value of the variable Initial_value is equal to 7.

The system determines the overall initial latency 1250 from the initial latency inherent to the system 1240, the number First_transportMB of encoded data blocks to be transported during the (first) transport period 1201 and the shift necessary for the start of the transition macro-block to be aligned with the start of the next transport period during a source encoding change. After this overall initial latency 1250 has elapsed, the transport layer transports the First_transportMB data blocks encoded during the transport period 1201.

For each following transport period 1202 and 1203, the transport layer fills all the transport packets until the counter of transported macro-blocks Cpt_TransportMB reaches a macro-block target value predetermined for the transport period. This macro-block target value corresponds to the threshold macro-block whose index is obtained by adding up the value of the counter Cpt_ApplicationsMB (recorded at the end of the macro-block encoding window) and the value of the variable Initial_value determined during the initialization.

In the example illustrated by FIG. 12, for the transport period 1202, the value of the index of the threshold macro-block is equal to 20. In other words, the transport layer should not transport the 20$^{th}$ macro-block during the transport period 1202. In this example, the last macro-block transported by the transport layer is the 19$^{th}$ macro-block. No drift correction is therefore necessary.

In the example illustrated by FIG. 12, for the transport period 1203, the value of the index of the threshold macro-block is equal to 31. In this example, it is necessary to add padding data as a complement to the encoded data blocks included in the transport period 1203. Indeed, in this example, the 31$^{st}$ macro-block is already reached before all the transport packets have been filled. The transport layer therefore adds padding data 1260 to the end of the 30$^{th}$ macro-block until all the transport packets are filled. Without the adding of these padding data, the number of macro-blocks transported during the transport period 1202 would be greater than the number MB threshold authorized (defined with reference to FIG. 4) which would lead to a modification of the end-to-end latency and could therefore, after a given time, lead to a break in service. The adding of these pieces of padding data would also postpone the transport of the 31$^{st}$ macro-block to the next transport period. Thus, the difference between the production and the transport of the data blocks would be kept at an acceptable fixed value, i.e. a value corresponding to the precision of the other elements of the system (jitter in network events for example).

Figure 13:
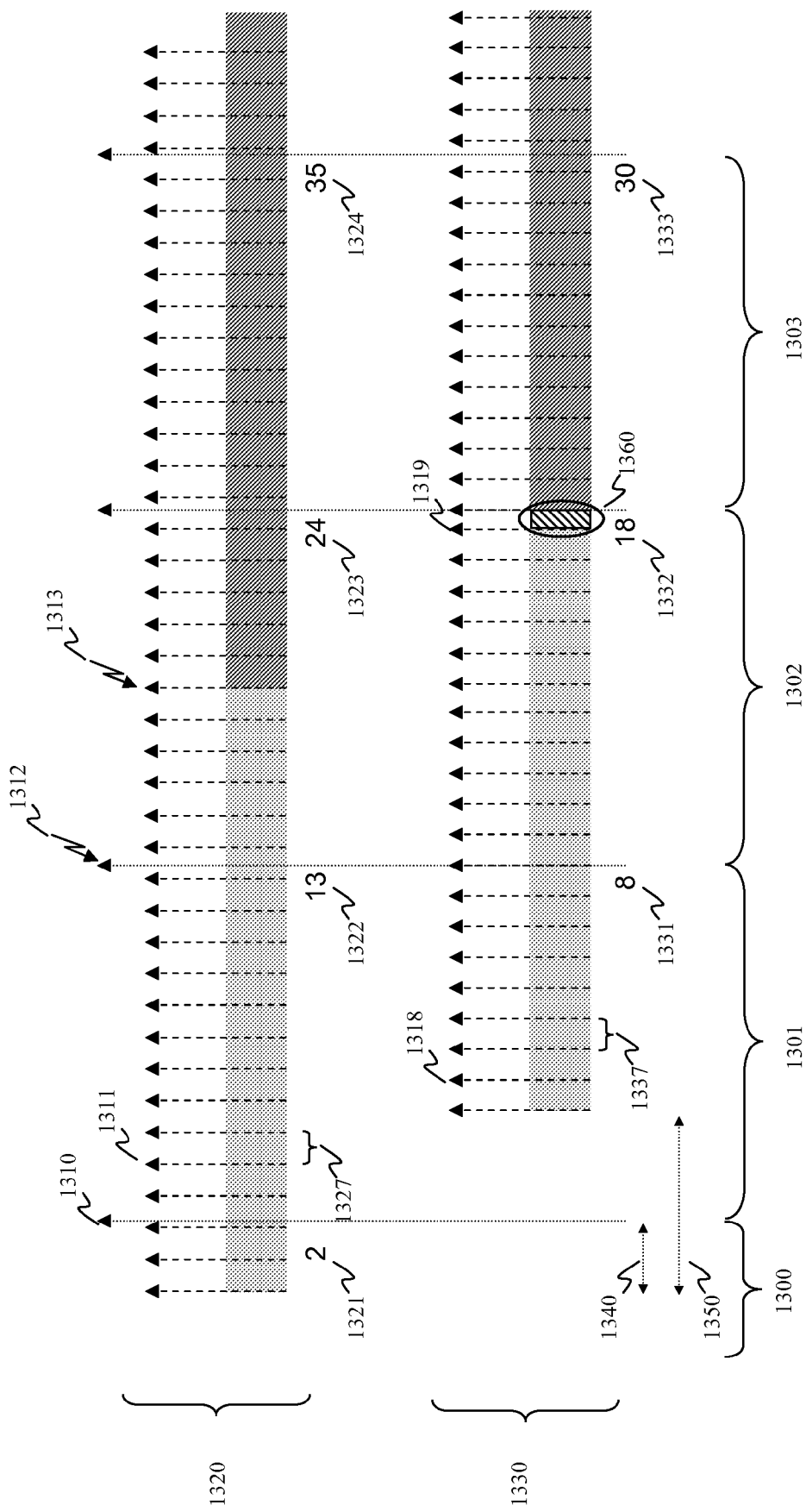
FIG. 13 is a schematic illustration of the principle of a particular embodiment of the invention through an example of correction of a drift between a data production rate and a rate of transport of this data in the case of a change in source encoding.

FIG. 13 schematically illustrates the principle of a particular embodiment of the invention, through an example of correction of a drift between the rate of production of the data by the applications layer and the rate of transport of this data by the transport layer, in the case of a change in source encoding.

FIG. 13 can be sub-divided into a top part and a bottom part, referenced 1320 and 1330 respectively.

The top part 1320 illustrates the generation (at the applications layer) of the data blocks (macro-blocks) encoded by the application of a source encoding to the raw applications data given by the application. The top part 1320 includes four time periods 1300 (represented partially), 1301, 1302 and 1303 corresponding to four encoding windows. The start of each encoding window is aligned with a network event 1310.

In the example illustrated, the video application starts giving applications data blocks during the period 1300. Each start of an applications data block is represented by a dashed arrow 1311. Each applications data block is encoded during an encoding period 1327.

During the first and second encoding windows 1300 and 1301, the pieces of raw applications data are encoded (compressed) according to a first source encoding. During the third encoding window 1302, the raw applications data are encoded according to the first source encoding and then a second source encoding. During the fourth encoding window 1303, the raw applications data are encoded according to the second source encoding.

At the start of the third encoding window 1302, a source encoding change request 1312 is received. The source encoding change managing module 250 determines the transition macro-block (MB_transition) 1313 on which the source encoding change must take place and which will be aligned with a start of a transport period.

The bottom part 1330 illustrates a transport sequence (at the transport layer) of the encoded data blocks (macro-blocks).

The network event 1310 is represented such that it is common to the bottom part 1330 and the top part 1320 of FIG. 13. Thus, the four time periods 1300 (this period being shown partially) 1301, 1302 and 1303 also correspond to the four transport periods. Each start of an encoded data block is represented by the dashed arrow 1318. Each encoded data block is transmitted by the transport layer during a transport sub-period 1337.

A counter Cpt_TransportMB (described with reference to FIGS. 5, 6 and 7) counts the encoded macro-blocks transported by the transport layer. This counter Cpt_TransportMB is incremented at the end of each transport sub-period 1337 and the value of this counter is recorded in a table at the end of each transport period 1331, 1332 and 1333.

As described with reference to FIG. 4, in an initialization phase, the system computes the value of the variable Initial_value. In the example illustrated, the value of the variable Initial_value is equal to 7.

The system determines the overall initial latency 1350 from the initial latency inherent to the system 1340, the number First_transportMB of encoded data blocks to be transported during the (first) transport period 1301 and the shift necessary for the start of the transition macro-block to be aligned with the start of the next transport period during a source encoding change. After this overall initial latency 1350 has elapsed, the transport layer transports the First_transportMB data blocks encoded during the transport period 1301.

For the second transport period 1302, the transport layer fills all the transport packets until the counter of transported macro-blocks Cpt_TransportMB reaches the value MB_transition (corresponding to the transition macro-block) determined following the reception of the source encoding change request 1312. In the example illustrated by FIG. 13, the value MB_transition is equal to 19. In other words, the transition macro-block is the 19$^{th}$ macro-block. In this example, when the counter Cpt_TransportMB reaches the value MB_transition, the system adds padding data 1360 to the end of the 18$^{th}$ macro-block until the 19$^{th}$ macro-block is aligned with the start of the third transport period 1303. Thus the change in bandwidth and the change in source encoding can occur synchronously, i.e. without any transition period. This maintains a constant end-to-end latency in the context of a combined change in bandwidth and in source encoding and also maximizes the use of the bandwidth allocated to the application.

The adding of these pieces of padding data also maintains the difference between the production and the transport of the data blocks at an acceptable fixed value, i.e. a value corresponding to the precision of the other elements of the system (jitter in network events for example).

The invention claimed is:

1. A method for managing transmission of a data stream from a sending device, the sending device receiving applications data blocks to be transmitted to a receiving device according to a clock rate defined by transport periods, the applications data blocks being encoded before transmission by application of a first source encoding up to the processing of a change request at the sending device for changing said encoding to a second source encoding prior to transmission, in which method the sending device:

determines a drift as a difference between a number of
applications data blocks received by the sending device
and a number of encoded applications data blocks transmitted prior to the change request by the same sending
device;

determines, taking account of the determined drift, a transition applications data block from which the second
source encoding is applied to said received applications
data blocks prior to transmission from the sending
device, in response to the change request; and adapts the transmission of the stream by adding padding
data, such that the transmission of the encoded transition
data block is aligned with a start of a transport period.

2. The method according to claim 1, wherein determining the drift comprises:

identifying the last encoded data block that has been transmitted during the transport period preceding the processing of the change request;

determining the quantity of data transmitted from the last identified encoded data block;

and the transition applications data block is determined taking account also of the determined quantity of transmitted data.

3. The method according to claim 1, wherein the sending device chooses a time shift to be applied between the instant of start of reception of the applications data blocks and the instant of start of transmission of the encoded data blocks, as a function of a period of time needed for executing the determining of the drift and the determining of the transition applications data block.

4. The method according to claim 1, wherein the sending device:

determines a number of applications data blocks representing a cumulative sum of variation in size of encoded data blocks to be transmitted relative to a target value of size; and determines the transition applications data block taking account also of the determined number of applications data blocks.

5. The method according to claim 1, wherein adapting the transmission of the stream comprises adding pieces of padding data, as a complement to the encoded data block transmitted just before the encoded transition data block, until the encoded transition data block is aligned with a start of a transport period.

6. The method according to claim 1, wherein the size of the applications data blocks is chosen as a function of the precision of a clock defining the clock rate.

7. A non-transitory computer-readable storage medium storing a program executable by a computer in a sending device to manage transmission of a data stream from the sending device, the sending device receiving applications data blocks to be transmitted to a receiving device according to a clock rate defined by transport periods, the applications data blocks being encoded before transmission by application of a first source encoding up to the processing of a change request at the sending device for changing said encoding to a second source encoding prior to transmission, and the program when executed causing the sending device to:

determine a drift as a difference between a number of applications data blocks received by the sending device and a number of encoded applications data blocks transmitted prior to the change request by the same sending device;

determine, taking account of the determined drift, a transition applications data block from which the second source encoding is applied to said received applications data blocks prior to transmission from the sending device, in response to the change request; and adapt the transmission of the stream by adding padding data, such that the transmission of the encoded transition data block is aligned with a start of a transport period.

8. A sending device which manages transmission of a data stream, the sending device receiving applications data blocks to be transmitted to a receiving device according to a clock rate defined by transport periods, the applications data blocks being encoded before transmission by application of a first source encoding up to the processing of a change request at the sending device for changing said encoding to a second source encoding prior to transmission, the sending device comprising:

a memory; and a processor coupled to the memory, configured to determine a drift as a difference between a number of applications data blocks received by the sending device and a number of encoded applications data blocks transmitted prior to the change request by the same sending device;

the processor configured to determine, taking account of the determined drift, a transition applications data block from which the second source encoding is applied to said received applications data blocks prior to transmission from the sending device, in response to the change request; and the processor configured to adapt the transmission of the stream by adding padding data, such that the transmission of the encoded transition data block is aligned with a start of a transport period.

* * * * *